United States Patent [19]

Okamura

[11] 4,240,228

[45] Dec. 23, 1980

[54] SEALING APPARATUS FOR REFRIGERATORS AND METHOD OF MANUFACTURE THEREOF

[75] Inventor: Yasuhiro Okamura, Osaka, Japan

[73] Assignee: Tokyo Shibaura Denki Kabushiki Kaisha, Kawasaki, Japan

[21] Appl. No.: 15,915

[22] Filed: Feb. 28, 1979

[30] Foreign Application Priority Data

Mar. 2, 1978 [JP] Japan .................. 53-23796

[51] Int. Cl.³ ........................... E06B 7/16
[52] U.S. Cl. ................. 49/478; 49/485; 49/498; 277/235 R; 428/113
[58] Field of Search .......... 277/235 R, DIG. 6; 49/478, 498, 487, 485; 335/303; 428/113, 492

[56] References Cited

U.S. PATENT DOCUMENTS

| | | | |
|---|---|---|---|
| 2,802,763 | 8/1957 | Freedlander | 428/492 |
| 3,138,833 | 6/1964 | Neuman | 49/478 |
| 3,184,807 | 9/1965 | Schornstheimer et al. | 335/303 |
| 3,378,957 | 4/1968 | Frehse | 49/478 |
| 3,788,651 | 1/1974 | Brown et al. | 277/DIG. 6 |
| 4,138,049 | 2/1979 | McAlarney | 49/478 |

*Primary Examiner*—William R. Dixon, Jr.
*Attorney, Agent, or Firm*—Oblon, Fisher, Spivak, McClelland & Maier

[57] ABSTRACT

A picture-frame shaped gasket for refrigerators is fixed on the inside margin of the door for preventing leakage of cold, and at least the lower side of the gasket is formed of soft synthetic resin which has been mixed with reinforcing fibres so as to provide a gasket of high strength.

3 Claims, 8 Drawing Figures

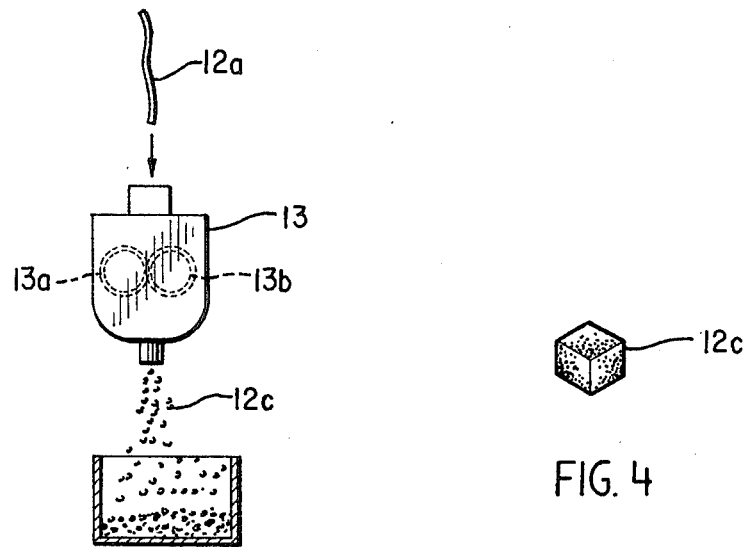
FIG. 3
FIG. 4
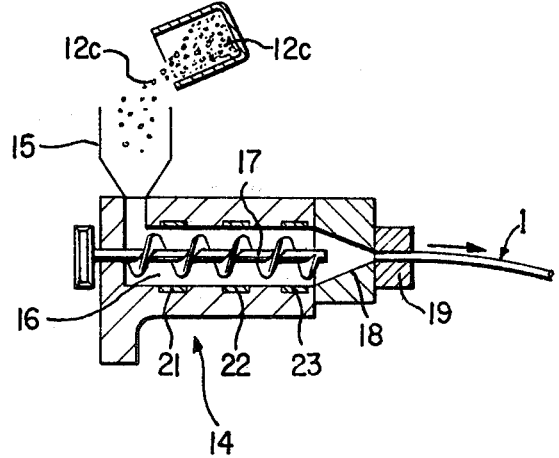
FIG. 5

«4,240,228»

SEALING APPARATUS FOR REFRIGERATORS AND METHOD OF MANUFACTURE THEREOF

BACKGROUND OF THE INVENTION

1. Field of the Invention

This invention relates to a gasket for use in refrigerators and a method of manufacture thereof whereby gaskets of high strength can be obtained.

2. Description of the Prior Art

As is well known, an approximately picture-frame shaped gasket is fixed on the inside margin of the door of a refrigerator so as to press against the margin of the opening of the refrigerator to prevent leakage of cold air. This gasket is conventionally formed of material of which the main constituent is soft vinyl chloride. Such gaskets have the drawback in that they suffer damage such as breakage and cracks when subjected to expansion and compression when opening and closing or when very sticky liquids such as juice and gravy containing sugar or fats and oils stick to the margin of the opening of the cold chamber. Frequent changing of the gasket is therefore necessary. Such damage is particularly marked at the lower part of the gasket where liquids are especially liable to stick.

SUMMARY OF THE INVENTION

The invention was made after consideration of the above facts. The object is therefore to provide sealing apparatus for refrigerators and a method of manufacture thereof whereby gaskets can be obtained whose strength is fully satisfactory in use and which are not easily damaged to which they are subjected, on opening of the door, by the adhesive force of adhered liquids or the expanding and contracting force operating during opening and closing of the door.

A sealing apparatus for refrigerators and a method of manufacture thereof according to this invention are explained below with reference to an embodiment shown in the drawings.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 2A is a perspective view of main parts in the method of making the gasket and is given in explanation of the mixing and kneading action and equipment therefor while

FIG. 3 is a view given in explanation of the step whereby pellets are obtained;

FIG. 4 is a perspective view showing a pellet;

FIG. 5 is a cross-sectional view given in explanation of the extrusion forming step and equipment therefor;

DESCRIPTION OF THE PREFERRED EMBODIMENTS

Figure 1:
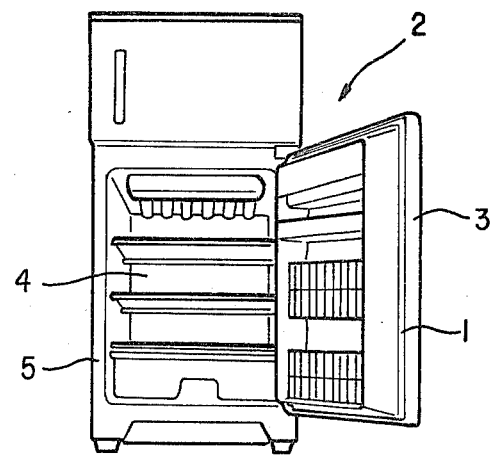
FIG. 1 is a perspective view of a refrigerator using a gasket constructed according to this invention.

FIG. 1 shows a refrigerator 2 having a gasket 1 which is constructed in accordance with this invention. In this refrigerator 2, door 3 can be freely opened or closed by means of cooperation with the margin 5 of the opening of the cold chamber and the gasket. An approximately picture-frame shaped gasket 1 is fixed on the inner margin of the door 3 opposite to the margin 5 of the said opening.

Figure 2A:
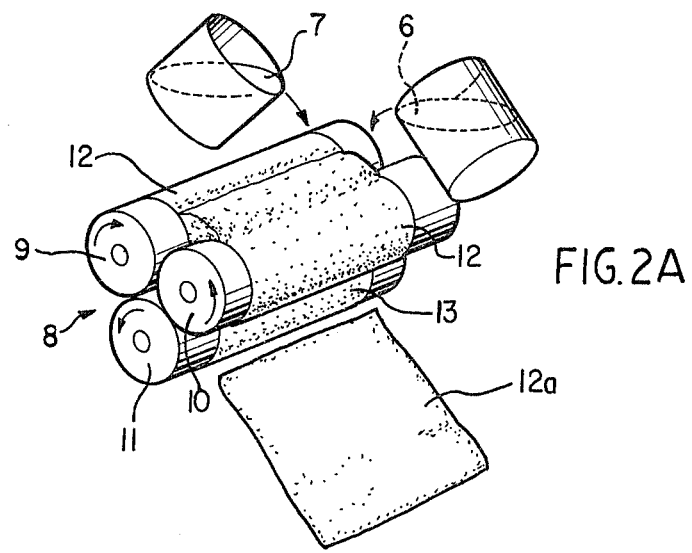
Figure 2B:
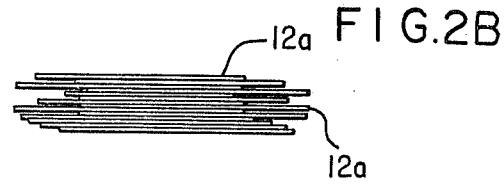
FIG. 2B shows a cross sectional view of the sheets produced in making the gasket.
Figure 6:
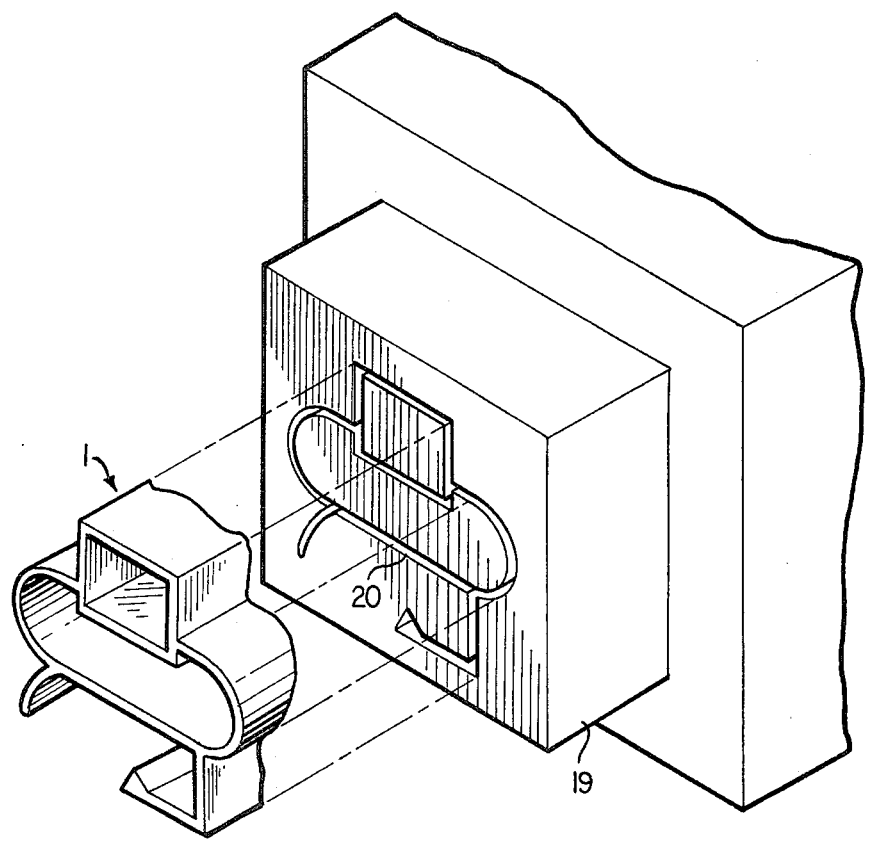
FIG. 6 is a notch perspective view of the mold.

The construction of this gasket 1 is explained below. In FIG. 2, the molding material 6 consists of a thermoplastic synthetic resin, particularly one of which the major constituent is soft vinyl chloride, a degree of polymerization ($\bar{P}$) of the vinyl chloride of 2700 being employed. This is the same as that used for the molding material of previously used gaskets. Such a molding material 6 may be produced using as a plasticizer 78% polyester (weight ratio as explained hereinbelow), 10% epoxy, 12% calcium carbonate, and in addition some epoxy oil reformer, stabilizer (Ca-Ba), lubricant, and pigment, mixing these by an ordinary mixer to disperse and blend them and continuing the mixing process for about 40 min. The molding material 6 thus produced is also known as "blending compound". Reference numeral 7 in FIG. 2 indicates the reinforcing fibre which is used in this invention. For this reinforcing fibre, in the case of this embodiment, vinylon fibre is used. However, other fibres can be used in this invention, and specific examples of fibres which can be so used are shown in the "specific examples" column of Table 1 below.

TABLE 1

| Type of fibre | Specific Examples |
|---|---|
| Chemical fibres | Reconstituted fibre, semi-synthetic fibre, synthetic fibre (e.g. vinylon), inorganic fibre |
| Natural fibre | plant fibre, animal fibre, mineral fibre |

The above vinylon fibre (reinforcing fibre) 7 is of 0.5 denier and about 5 mm length. However, for this invention, from the point of view of reinforcing capability and moldability the fibre may be of about 0.2 to 0.5 denier and of length about 3 to 6 mm. 0.2 to 1.0% by weight of such vinylon fibres 7 are mixed with the molding material 6. To achieve this, the two materials 6 and 7 are mixed and kneaded together by introducing them into a roller type mixing and kneading machine 8 for about 40 min so that they are evenly dispersed.

The rollers 9, 10, and 11 rotate in the direction shown by the arrows in FIG. 2. Viscosity is produced by frictional heating etc. of the mixture of these two materials 6 and 7 and extension and compression are repeatedly applied to the mixture which adheres to the rollers 9, 10, and 11 so that uniform dispersal and blending is achieved. In this mixing and kneading process, from the point of view of obtaining uniform dispersal, it is effective to divide the vinylon fibre 7 which is to be mixed into five equal parts beforehand and introduce each fifth part to the roller type mixing and kneading machine 8 in alternate periods of one minute (i.e. taking one minute for the introduction of each fifth part, with an interval of one minute therebetween). When the mixing and kneading has continued for about 40 min, the mixture 12, which is wrapped round and stuck to the roller 11 and rotates with it, is cut at the position of the line 13. By withdrawing the mixture 12 from this cut to form an end, the mixture is separated from the roller 11 as it rotates as constant lengths to obtained sheets 12a of mixed material.

The mixing and kneading of the vinylon fibre 7 and the main molding material 6 to achieve uniform dispersal thereof may be carried out using an ordinary mixer, but from the point of view of achieving uniform blending use of the roller type mixing and kneading machine 8 described above is preferable. The sheets 12a of mixed material molded as above are slowy cooled for about 30 min. Then, as shown in FIG. 3, they are introduced into the cutter 13, where they are cut into squares having a side of about 5 mm as shown in FIG. 4, to obtain pellets 12c. The vinylon fibre 7 is exposed as a nap of length about 1 mm or less on the surface of the pellet 12c. The characteristic values of a pellet 12c containing vinylon fibre 7 constructed as above are shown in Table 2 below. An increase of about 0.3 kg/mm$^2$ in the tensile strength and about 33% in the elongation percentage can be seen in comparison to pellets not containing vinylon fibre.

TABLE 2

| Type | Characteristic values | | |
|---|---|---|---|
| | Tensile Strength | Extension | Modulus |
| Containing no fibre | 0.92 kg/mm$^2$ | 210% | 0.50 kg/mm$^2$ |
| Containing 1% vinylon fibre | 1.23 kg/mm$^2$ | 280% | 0.5 kg/mm$^2$ |

Pellets 12c produced as above are introduced into the hopper 15 of an extrusion machine 14 as shown in FIG. 5 to form the product. In FIG. 5, reference numeral 16 is the cylinder, reference numeral 17 is the screw shaft, reference numeral 18 is the nozzle, and reference numeral 19 is the cross-head die (i.e. mold), which is arranged at the outlet of nozzle 18, where there is provided an extrusion hole 20 formed of the same shape and cross section as the gasket 1 which is to be finally obtained. When extruding, the refuse-collecting mesh which is normally arranged at the end of the extrusion machine 14 is removed. Reference numerals 21, 22, and 23 are heaters for heating the pellets 12 as they pass through the cylinder 16. Table 3 shows the conditions No. 1 and No. 2 of the extrusion machine when extrusion is performed.

TABLE 3

| | Temp. of cylinder 16 | | | | | |
|---|---|---|---|---|---|---|
| | Region of heater 21 | Region of heater 22 | Region of heater 23 | Temp. of nozzle 18 | Temp. of mold 19 | Speed of screw shaft 17 |
| No. 1 | 110° C. | 110° C. | 115° C. | 117° C. | 120° C. | 70 rpm |
| No. 2 | 140° C. | 150° C. | 150° C. | 160° C. | 160° C. | 60 rpm |

Figure 7:
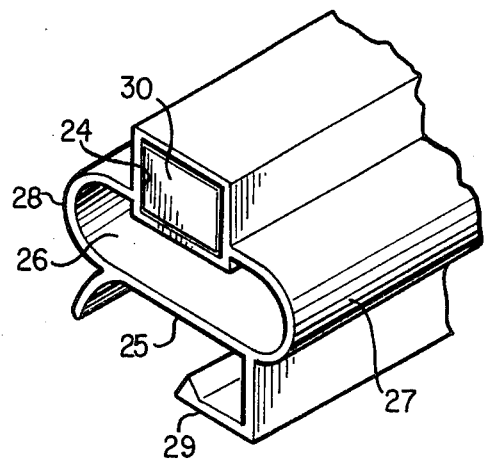
FIG. 7 is a partial perspective view of the gasket.
Figure 8:
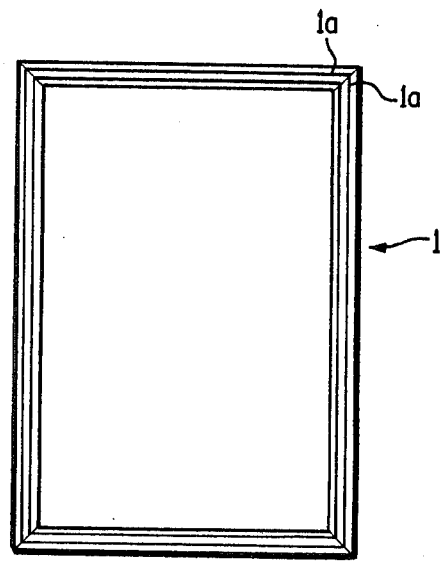
FIG. 8 is a plan view of the completed gasket.

A molded gasket 1 is obtained from the extrusion hole 20 of the mold 19 by extrusion of pellets 12c under the no. 1 conditions of Table 3 in the direction of the nozzle 18 by means of the screw shaft 17 within the cylinder 16. As shown in FIG. 7, the cross-sectional shape of this gasket 1 consists of a hollow part 24 for insertion of a magnet, buffer elements 27, 28 which form a kind of buffer space 26 with a base element 25 and extend from both outer sides of this hollow part 24, and a connecting part 29 for gripping the door 3. The thus obtained gasket 1 is cut to predetermined lengths and both ends of these are then cut in inclined fashion as shown in FIG. 8 and a magnetic cord 30 of the permanent magnet type is then inserted in the said hollow part 24. These inclined cut ends 1a are then pressed together with a pressure of 0.8 kg/cm$^2$ and subjected to heat welding in a hot welding machine at a temperature of 180° C. to 220° C. for approximately 2 sec. to obtain an approximately picture-frame shaped gasket 1 as shown in FIG. 8, which is then fitted on the door 3.

The No. 2 conditions of Table 3 are applicable when molding material of high degree of polymerization is used for the gasket.

The characteristics of gaskets produced as in the embodiment of the invention described above and those of gaskets not containing reinforcing fibre are shown in Table 4, from which it can be seen that the life of the former is much longer than that of the latter, previously used product.

TABLE 4

| | Characteristic values | |
|---|---|---|
| Item | Previously used gaskets not containing fibre | Gaskets according to this embodiment of this invention |
| (1) Tensile strength kg/mm$^3$ | 0.92 | 1.23 |
| (2) Elongation percentage % | 210 | 280 |
| (3) Modulus kg/mm$^3$ | 0.50 | 0.50 |
| (4) Hardness (20° C.) | 67 | 67 |
| (5) Loss on heating (%) | 0.5 | 0.5 |
| (6) Hardness after oil-proofing (immersion in "Tempura" *oil for 168 h at 40° C.) | 65 | 65 |
| (7) Life (30 samples) Conditions (1) 5° C. (2) 20 times/min (3) covered with "Tempura" oil | broke after 60,000– 110,000 times | no apparent change after more than 110,000 times |
| (4) one coating for 30 min with concentrated lactobacillus beverage | breakage after less than 3600 times | breakage at more than 12400 times but may withstand up to 12000 times |

*"Tempura" oil: oil for deep-fat frying of foods known as "tempura" in Japan, such as prawns.

Of the four sides of the completed gasket, it may suffice to make only the lower side, which is the one most liable to damage, by the method of this invention.

As described above, this invention is characterized in that gaskets for refrigerators are manufactured by: a mixing and kneading step in which reinforcing fibres of length 3 to 6 mm and about 0.2 to 0.5 denier are mixed with and uniformly dispersed in a main holding material of which the main constituent is soft vinyl chloride; a step in which the material which has been mixed and kneaded in the foregoing step is withdrawn in predetermined amounts and finely cup up into pellets; and a step in which the pellets obtained in the foregoing step are formed into a gasket by an extrusion molding machine.

Thanks to the action of these reinforcing fibres, the refrigerator gaskets obtained by this manufacturing process resist damage for a long period due to the stress of expansion and contraction when opening and closing of the door is repeatedly carried out and the repeated application of tensile force to the viscosity of adhering liquids, so that their life is 3.5 or more times longer than that of the previously used products. Furthermore, from the point of view of manufacture, since the cost is only raised by the value of the reinforcing fibre and the value of the increased time required for mixing and kneading, the previously employed equipment being usable with scarcely any modification, the overall cost shows only a slight increase.

Obviously, many modifications and variations of the present invneiton are possible in light of the above teachings. It is therefore to be understood that within the scope of the appended claims, the invention may be practiced otherwise than as specifically described herein.

What is claimed as new and desired to be secured by Letters Patent of the United States is:

1. A gasket for refrigerators, which gasket is approximately of picture-frame shape having a plurality of sides and is provided for sealing the inside margin of the door with which the storage space of a refrigerator is provided for insertion and removal of food, comprising at least a lower side of said plurality of sides consisting of soft synthetic resin and 0.2 to 1% by weight of mixed individual reinforcing fibres.

2. A gasket for refrigerators, which gasket is approximately of picture-frame shape having a plurality of sides and is provided for sealing the inside margin of the door with which the storage space of a refrigerator is provided for insertion and removal of food, comprising at least a lower side of said plurality of sides consisting of soft synthetic resin and 0.2 to 1% by weight of mixed individual reinforcing fibres wherein said reinforcing fibres are of 0.2 to 0.5 denier and 3–6 mm in length.

3. A gasket for refrigerators which gasket is approximately of picture-frame shape having a plurality of sides and is provided for sealing the inside margin of the door with which the storage space of a refrigerator is provided for insertion and removal of food, comprising at least a lower side of said plurality of sides consisting of soft synthetic resin and 0.2 to 1% by weight of mixed individual reinforcing fibres and further comprising a hollow part;
   a flexible magnet mounted within said hollow part;
   a connecting element connected to the door, and
   a buffer element interconnecting said connecting element and the hollow part.

* * * * *